United States Patent [19]
Grinderslev

[11] Patent Number: 5,216,734
[45] Date of Patent: Jun. 1, 1993

[54] FIBER OPTIC CONNECTOR HAVING LOW COST FERRULE

[75] Inventor: Soren Grinderslev, Shelton, Conn.
[73] Assignee: AMP Incorporated, Harrisburg, Pa.
[21] Appl. No.: 897,867
[22] Filed: Jun. 12, 1992
[51] Int. Cl.⁵ .............................................. G02B 6/38
[52] U.S. Cl. ......................................... 385/60; 385/66; 385/68; 385/84; 359/900
[58] Field of Search ................ 385/60, 61, 62, 63, 385/66, 68, 78, 79, 81, 84; 359/900

[56] References Cited

U.S. PATENT DOCUMENTS

| | | | |
|---|---|---|---|
| 3,946,467 | 3/1976 | Lukas et al. | 24/260 |
| 4,107,242 | 8/1978 | Runge | 264/1 |
| 4,190,317 | 2/1980 | Makuch | 350/96 |
| 4,440,471 | 4/1984 | Knowles | 350/96.20 |
| 4,607,911 | 8/1986 | Rhodes | 350/96.20 |
| 4,645,296 | 2/1987 | Cattin et al. | 350/96.21 |
| 4,679,895 | 7/1987 | Huber | 350/96.20 |
| 5,071,218 | 12/1991 | Nishimoto | 385/60 |
| 5,088,804 | 2/1992 | Grinderslev | 385/81 |

FOREIGN PATENT DOCUMENTS

| | | | |
|---|---|---|---|
| 0053914 | 6/1982 | European Pat. Off. | |
| 2-193108 | 7/1990 | Japan | 385/66 |
| 8601610 | 3/1986 | PCT Int'l Appl. | |
| 9001714 | 2/1990 | PCT Int'l Appl. | |

Primary Examiner—John D. Lee
Assistant Examiner—John Ngo
Attorney, Agent, or Firm—Lahive & Cockfield

[57] ABSTRACT

A fiber optic connector has a low cost ferrule assembly that protectively supports, positions and aligns an optical fiber The ferrule has an outer ferrule body terminating in an alignment passage and which seats an inner support member within which the fiber extends. This ferrule is particularly advantageous for use with unbuffered optical fibers and adhesiveless connectors.

5 Claims, 1 Drawing Sheet

FIBER OPTIC CONNECTOR HAVING LOW COST FERRULE

BACKGROUND

This invention relates to an optical fiber connector and to a ferrule for use in such a connector. In particular, the invention relates to a fiber optic connector having an improved ferrule structure that supports and positions the optical fiber in the connector for communication with a second fiber.

The invention also provides a new ferrule structure, for a fiber optic connector, having advantages in manufacture ease and cost.

Fiber optic communication cables typically include at least one light transmitting optical fiber clad in an optically insulating material. The cladding protects the glass fiber, and prevents dispersion of light out of the optical fiber The fiber optic cable usually has a protective external buffer, typically of a plastic material, which may or may not be removed to terminate the cable.

The growing use of fiber optic systems creates a need for a connector capable of coupling segments of light-conductive cable for maximal light transmission. To achieve efficient light transfer between fiber optic cables, the optical fibers must be aligned to high precision, as well as properly spaced with or without touching, whichever is specified. The alignment and spacing requirements are exceedingly demanding, due to the minute, micron-size diameter of the optical fibers being connected, coupled or otherwise terminated.

A known fiber optic connector has a ferrule that holds the final length of the fiber in place so that it can abut another fiber at a faceted end. Each such connector ferrule is to have a precision bore that receives and thereby positions a fiber, to achieve the proper alignment. Even minute movement or errors in fiber position can cause significant optical losses. These problems can be even more acute with non-adhesive connectors, i.e. connectors in which the fiber is secured mechanically rather than with epoxy or other adhesive. In at least one non-adhesive connector, a relatively long length of the fiber, with the buffer layer removed, is to be supported and positioned. If a ferrule having a large diameter bore terminating in a small opening is used to hold the fiber, the ferrule can contain a substantial length of unsupported, unbuffered fiber. This long unsupported fiber is subject to flex, which can cause excessive detrimental optical loss and even fiber breakage. Unwanted flexing of the fiber is particularly apt to occur during the polishing of the facet end of the optical fiber.

U.S. Pat. Nos 5,088,804 and 4,679,895 disclose fiber optic connectors that secure an optical fiber mechanically, and without adhesives.

It is known to support the unbuffered fiber in a connector within a ceramic ferrule having a small and highly concentric bore through its total length. The precision bore extends to the facet end of the connector. The ceramic ferrule supports the fiber over much of its unbuffered length and hence aligns and positions it. However, such ceramic ferrules with relatively long precision bores are costly. They are used because small bores or channels of comparable length and of the accuracy needed cannot easily be made in non-ceramic materials with present technology. A major problem is that drilling or otherwise manufacturing a ferrule requires a through hole of small diameter and precise concentricity, typically in the order of 0.005 inch diameter and 0.5 inch length. Present manufacturing methods encounter significant problems in forming precision holes whose length is more than ten times their diameter. This problem has led to the use of the foregoing costly ceramic ferrules, or to adhesives in the connector.

Accordingly, an object of this invention is to provide a structure for a fiber optic connector that supports a length of unbuffered optical fiber with dimensional precision, and with relatively low cost and readily fabricated connector parts.

It is also an object of the invention to provide a method of making a relatively low cost connector ferrule which can support an unbuffered optical fiber with the proper concentricity and alignment for the fiber.

Another object of the invention is to provide a ferrule useful with non-adhesive optical fiber connectors and characterized by relatively precise dimensions and low cost.

A further object of the invention is to provide a ferrule which can be made of less expensive materials than ceramic ferrules and yet provides the proper fiber alignment for use in high quality optical fiber connectors.

These and other objects and features of the invention will be apparent from the following description and the drawing.

SUMMARY OF THE INVENTION

A fiber optic connector according to the invention features a multi-piece ferrule for holding and supporting an unbuffered optical fiber. The assembled, multi-piece ferrule provides excellent support for long spans of unbuffered fiber. The ferrule is significantly less expensive than classic ceramic ferrules.

The ferrule is part of a connector that includes a body that mounts the ferrule. The connector holds and positions a first optical fiber, that has an unbuffered final length leading to the facet, to abut a second optical fiber carried in a second connector. The ferrule has a back end mounted to the counter body and has a front, facet end proximate to the location of the abutment of the first and second optical fibers.

A connector ferrule according to the invention has two pieces, rather than a single one-piece structure. The two pieces are telescopically nested together, in a concentric and coaxial configuration. More particularly, the ferrule has a tubular external ferrule body having a relatively large central cavity substantially concentric about a ferrule axis. This central cavity, which is many times larger in diameter then the fiber, is open at the back end and has a fiber holder at the facet end. The fiber holder has a forward positioning section with a precision positioning bore, for directly positioning and supporting the fiber. This positioning bore of the ferrule body is minimally larger than the diameter of the unbuffered optical fiber, and is radially concentric with the ferrule axis.

A second part of the ferrule is an inner support member that fits within the central cavity of the ferrule body. The inner support member has a channel throughout its length and which is substantially concentric with the ferrule axis. The diameter of the support member channel is such that the channel can support an unbuffered optical fiber without undue fiber flex.

The assembled ferrule of the invention, and particularly the inner support member, has low thermal expansion and contraction properties at least over the working temperature range of the connector. These connectors normally operate over a temperature range of about −20° C. to +60° C., and substantial expansion or contraction of the inner support member over this range can damage or misalign the fiber. Materials useful for making the inner support member are to provide sufficient support and thermal properties, and include thermoplastics such as polyether ether ketone, or metals such as stainless steel. The channel through the inner support member does not have to be as small or precise as the positioning bore in the ferrule body, provided it is sufficiently small to support and align the fiber.

Other aspects of the invention will be more apparent from the following description and the drawing.

DESCRIPTION OF THE ILLUSTRATED EMBODIMENT

A connector according to the invention employs a ferrule to support and position a length of unbuffered optical fiber. The ferrule is an assembly of an outer ferrule body and an inner support member. The outer ferrule body has an elongated central cavity that is open at a back end and that terminates at a front end in a fiber holder which includes a support section having a precision opening. The fiber holder supports and gives precise alignment to an unbuffered optical fiber at the site of signal transfer with another optical fiber in a mated connector. Assembled inside the ferrule body, in the cavity, is a support member having a through channel that provides substantial support to the unbuffered optical fiber over a relatively long span. The channel provides this degree of support without having the precise dimensional structure required at the facet opening. The support member is telescopically seated inside the ferrule body, typically with a close fit or small interference fit. The support member supports the fiber from being subjected to substantial flex or bending, and provides significant alignment of the fiber. The ferrule body can be machined or molded with conventional practices at relatively low cost from common materials such as stainless steel and aluminum, as well as from synthetic polymers, e.g. plastics. The support member can also have low cost, by using commercially extruded tubing stock. One preferred material for the support member is polyether ether ketone (PEEK) tubing, although various others can be used. One suitable PEEK tubing is marketed by Upchurch Scientific of Oah Harbor, Wash., USA, under the product designation 1531B. Accordingly, the two-piece ferrule of the invention can replace the expensive ceramic ferrule of the prior art, and it provides at least equivalent performance at significantly less cost.

Figure 1:
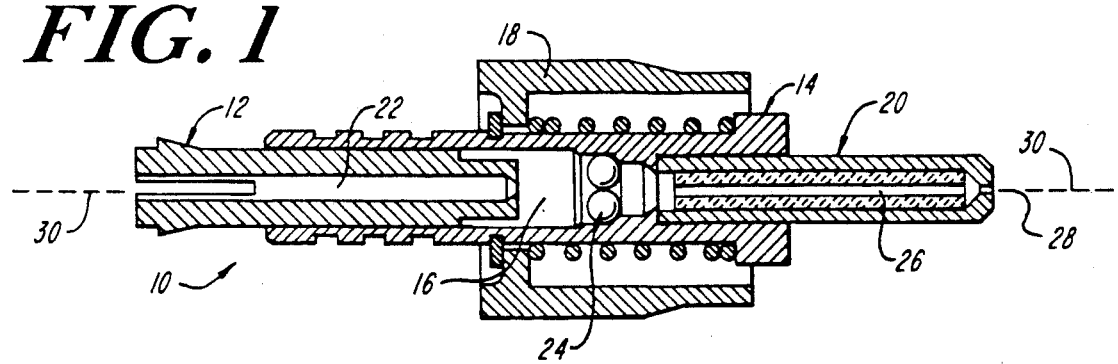
FIG. 1 is a diametrical sectional view of an adhesiveless fiber optic connector, partly assembled, and embodying features of the invention.
Figure 2:
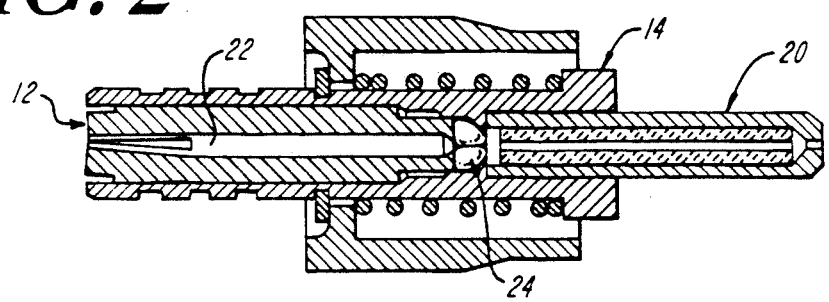
FIG. 2 shows the connector of FIG. 1 fully assembled.

FIGS. 1 and 2 show an adhesiveless optical fiber connector 10 of the general type described in more detail in U.S. Pat. No. 5,088,804, the disclosure of which is incorporated herein by reference. The connector 10, shown partly assembled in FIG. 1 and fully assembled in FIG. 2, has a rear body 12. An outer body 14 telescopically seats the rear body within a central passage 16 and joins to another connector device with a bayonet nut 18. The forward end of the outer body 14 mounts an axially-projecting ferrule 20. The illustrated outer body mountingly receives the ferrule with a press-fit within a bore forward of the passage 16. An unbuffered optical fiber (not shown) is placed in an axial through passage 22 in the rear body 12.

When the connector 10 is fully assembled, with the rear body 12 fully telescoped into the passage 16 of the outer body 14 as shown in FIG. 2, the fiber is held in place by the compressive action of resilient spheres 24. The unbuffered fiber extends through the ferrule 20, along a central axial channel 26, and exits at an opening at the connector facet end 28. The facet opening, the ferrule channel 20, the passage 22 of the rear body 12 and the passage 16 of the outer body 14 are co-axial and centered on an axis 30, on which the optical fiber is centered and aligned.

Figure 3:
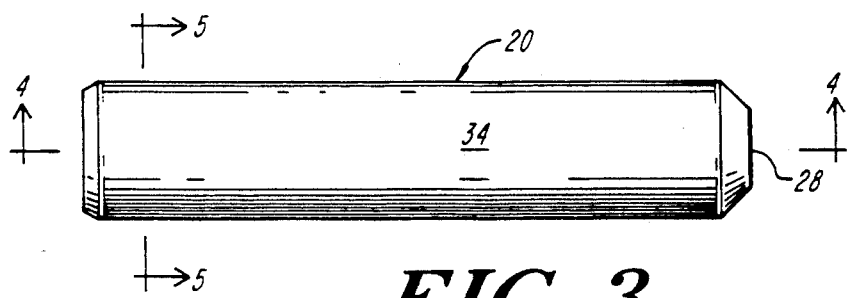
FIG. 3 is a plan view of the ferrule of the connector of FIG. 1.
Figure 4:
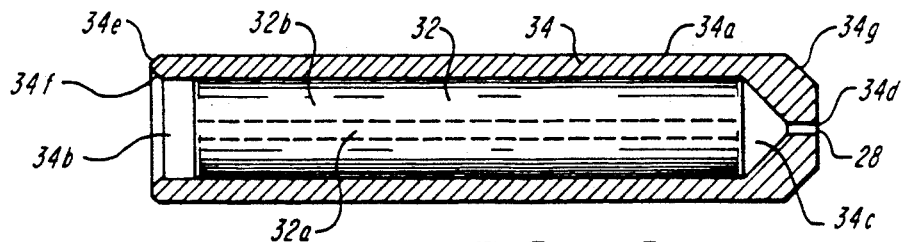
FIG. 4 is a longitudinal view of the ferrule of FIG. 3, partly in section along line 4—4.
Figure 5:
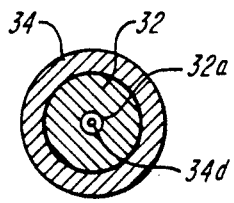
FIG. 5 is a transverse cross-sectional view of the ferrule of FIG. 3, taken along line 5—5.

The ferrule 20, as shown in FIGS. 3 and 4, is an assembly of a fiber-supporting member 32 within a ferrule body 34. The illustrated preferred ferrule body 34 has a cylindrical outer wall 34a elongated along the axis 30. The outer body is hollowed with an elongated inner cavity 34b, preferably cylindrical, that is open at the back end, i.e. at the left in the drawing. The cavity 34b extends axially for most but not all of the length of the ferrule body. Axially forward of the cavity 34b is a short transition section 34c having funnel-like inwardly-tapering walls. A precision passage 34d extends axially from the transition section to the facet end of the ferrule (rightmost in the drawings). The transition from the funnel-like walls to the passage 34d is smooth and free of burrs. The passage 34d, transition section 34c and cavity 34b form a continuous channel or passage through the ferrule body. The passage 34d, the cavity 34b and the cylindrical wall are concentric with the axis 28, as shown in FIGS. 4 and 5. The outer wall 34a of the illustrated ferrule body has a minor champfer 34e at the back end and a larger champfer 34g at the facet end; there is also a minor champfer 34f at the back end of the cavity 34b, all as shown in FIG. 4.

The support member 32 is a hollow sleeve-like insert that is slideably assembled to seat, preferably with minimal clearance to assure secure assembly, within the cavity 34b of the ferrule body. The hollow passage 32a within the support member forms the ferrule channel 26 (FIG. 1). More particularly, the illustrated preferred support member 32 has a tubular cylindrical shape, with a cylindrical outer wall 32b that seats with no significant clearance within the cavity 34b. The passage 32a is substantially concentric with the outer wall 32b on the axis 30. The axial length of the support member 32 is no longer than, and preferably as shown is slightly shorter than the cavity 34b. The support member accordingly can extend nearly the full length of the cavity from the transition section 34c to proximal the back end, as FIG. 4 shows.

Preferred materials for the ferrule body 34 are machinable or moldable solids with low thermal coefficient of expansion, such as stainless steel. The support member 32 can be of various materials that have a low thermal expansion coefficient, including thermoplastics and stainless steel. The support member 32 can be a commercially available extruded polymer tubing.

The precision passage 34d of the ferrule body is dimensioned to support and position the optical fiber therein with precision, as is known in fiber optic connectors. The passage 32a in the support member typically is larger and does not require such exacting precision. In one illustrative embodiment, for use with an unbuffered optical fiber of 125 microns diameter, the passage 34d is machined to have a diameter of 127 microns, and the passage 32a has a diameter of 0.010 ±0.001 inch.

The foregoing description is merely illustrative and those skilled in the art will understand other modifications to the described device. Such of the modifications and improvements are to be encompassed within the scope of the following claims.

What is claimed is:

1. In an optical fiber connector for holding a first unbuffered optical fiber with selected precise alignment and positioning for communication with a second optical fiber, said connector having a body mounting a ferrule, said ferrule having a back end secured to said body and a facet end, the improvement in which said ferrule comprises
  A. a ferrule body with a central cavity about a ferrule axis, said central cavity being open at the back end of said ferrule body and with a fiber holder at the facet end, said fiber holder having positioning means for supporting the first fiber terminating in a fiber-positioning and aligning passage radially concentric about said ferrule axis, and
  B. an inner support member assembled within said ferrule body, said inner support member having a fiber-supporting channel throughout its length radially concentric about said ferrule axis.

2. In a connector according to claim 1 the further improvement wherein a selected length of extruded tubing forms said support members.

3. In a connector according to claim 1 the further improvement wherein
  said ferrule body is machined or molded from non-ceramic material, and
  said support member is formed from a selected length of extruded polymer tubing.

4. In a method for the manufacture of optical fiber connector for holding a first unbuffered optical fiber with selected precise alignment and positioning for communication with a second optical fiber, wherein the connector has a body mounting a ferrule, and the ferrule has a back end secured to said body and a facet end, the improvement comprising the steps of
  A. assembling said ferrule with an inner support member seated within a ferrule body,
  preparing said ferrule body with a
  B. preparing said ferrule body with a central cavity about a ferrule axis, said central cavity being open at the back end of said ferrule body and with a fiber holder at the facet end, said fiber holder having positioning means for supporting the first fiber terminating in a fiber-positioning and aligning passage radially concentric about said ferrule axis,
  C. preparing said inner support member with a fiber-supporting channel throughout its length radially concentric about said ferrule axis, and
  D. telescopically assembling said inner support member within said cavity of said ferrule body, whereby said channel is concentric with said passage.

5. In a method according to claim 4, the further improvement comprising the steps of
  A. machining said ferrule body from a non-ceramic material, and
  B. forming said support member from a selected length of extruded polymer tubing.

* * * * *